Nov. 25, 1930. A. BREITLING 1,782,709
CHARGE TREATING DEVICE FOR INTERNAL COMBUSTION ENGINES
Filed June 6, 1929 2 Sheets-Sheet 2
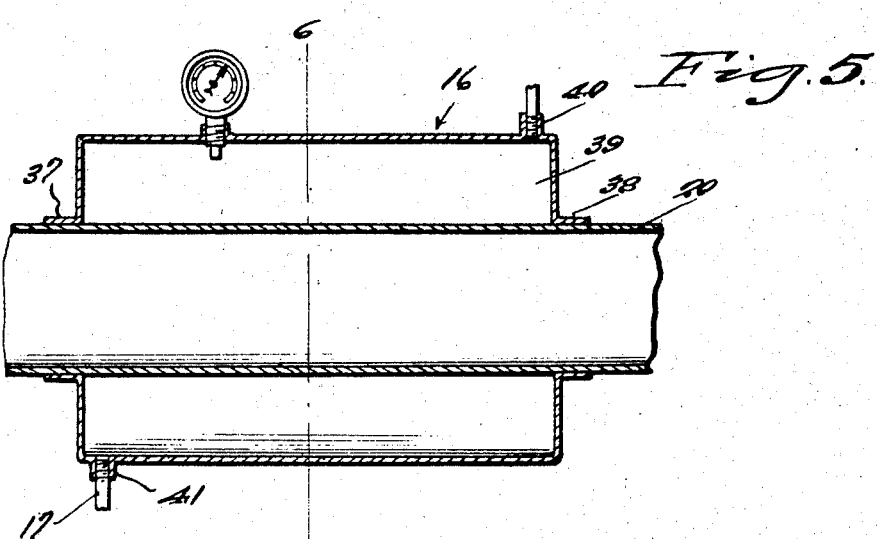
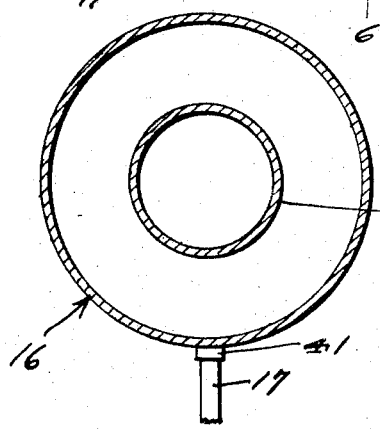
Inventor
Adolf Breitling
By Clarence A. O'Brien
Attorney Patented Nov. 25, 1930

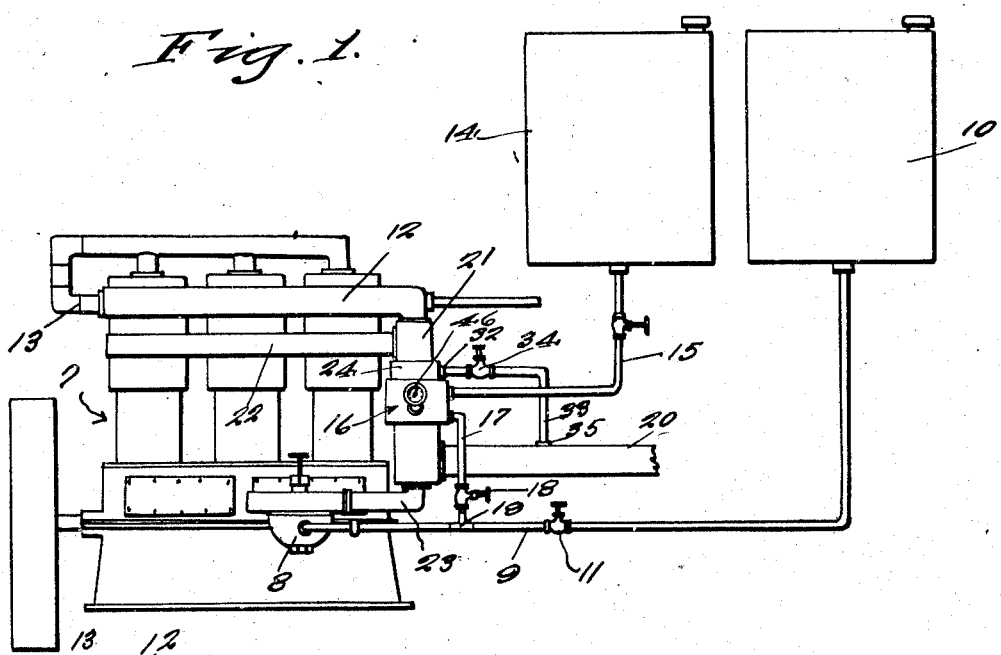
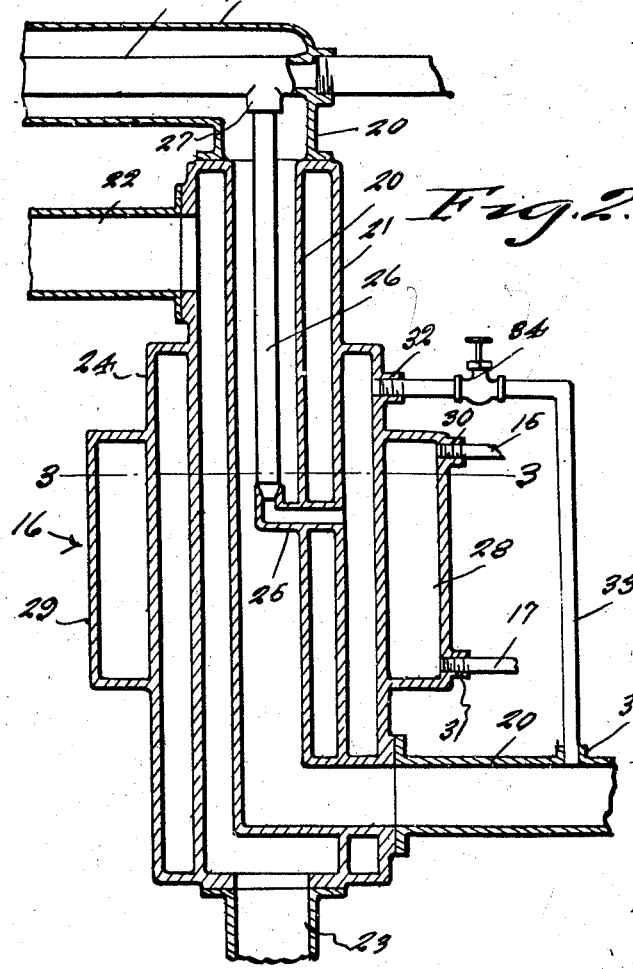
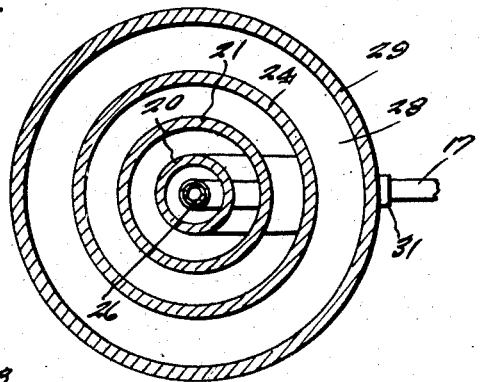

1,782,709

UNITED STATES PATENT OFFICE

ADOLF BREITLING, OF TAMPICO, MEXICO, ASSIGNOR OF EIGHTEEN PER CENT TO GUILLERMO LEON ZARATE AND SEVEN PER CENT TO JOHN E. PALMER

CHARGE-TREATING DEVICE FOR INTERNAL-COMBUSTION ENGINES

Application filed June 6, 1929. Serial No. 368,867.

This invention relates to charge treating devices for internal combustion engines adapted for using fuel such as gasolene, and the engine is particularly adaptable to motors where the exhaust manifold is water-cooled.

An object of the invention is to provide for selectively introducing a pre-heated hydrocarbon fuel to the carbureter of the internal combustion engine after the engine has become heated and running upon light hydrocarbon fuel.

Another object of the invention is to provide for selectively controlling the temperature of the heavy hydro-carbon fuel so as to promote the maximum efficiency of the internal combustion engine.

Further objects of the invention are to provide in a manner as hereinafter set forth, a device of the character referred to, which is very simple in its method of assembly, adaptable for installation on standard marine motors, very simple in its operation, thoroughly reliable for its intended use, strong, compact and durable, and comparatively inexpensive to manufacture and operate.

With the foregoing and other objects in view, the invention consists in a novel construction, combination and arrangement of parts as will be hereinafter more specifically described and illustrated in the accompanying drawings, wherein is disclosed a preferred embodiment of the invention, but it is to be understood that changes, variations and modifications may be resorted to without departing from the spirit of the claims hereto appended.

In the drawings, wherein like reference characters denote corresponding parts throughout the several views:

Figure 1 is a side elevation of a marine type internal combustion engine illustrating an adaptation therewith of a device in accordance with this invention.

Figure 2 is a fragmentary detailed, vertical sectional view through the exhaust and intake manifold and illustrating the device assembled on the exhaust pipe.

Figure 3 is a horizontal transverse detailed section taken substantially on line 3—3 of Figure 2.

Figure 4 is a side elevation of a marine internal combustion engine of a different character from that shown in Figure 1, and illustrating an adaptation therewith of the device in accordance with this invention.

Figure 5 is a vertical longitudinal section of the drum in accordance with this invention, and Figure 6 is a vertical section taken substantially on line 6—6 of Figure 5.

Various ways of treating heavier hydrocarbon fuel have been proposed in order to utilize a heavier hydro-carbon fuel as a charge in internal combustion engines primarily designed for operation on light hydrocarbon fuel such as gasolene. To those skilled in the art of internal combustion engines it has been found that an application of heat to the heavier hydro-carbon fuel will increase the efficiency thereof, but the present inventor has found that there is a point variable in every engine, beyond which the efficiency of the charge is decreased.

It has also been found that the point of maximum efficiency varies with every engine because of many factors entering into the consideration. It is to be understood that the present invention is to be utilized after the engine has been started and operated for awhile upon the gasolene fuel for which it was designed, and thereafter when the exhaust pipe has reached the predetermined temperature, the gasolene may be shut off and the heavier hydro-carbon fuel introduced into the carbureter of the engine.

Bearing the foregoing in mind, and referring to the drawings, 7 indicates generally an internal combustion engine having a carbureter 8 supported thereon in any conventional manner into which leads the conductor pipe 9 connected with the gasolene fuel tank 10. The conductor pipe 9 adjacent the gasolene fuel tank 10 is provided with a valve 11 by which the gasolene may be turned off when the engine has reached the proper heat.

In both types of engines illustrated in Figures 1 and 4 of the drawings the exhaust manifold 12 has a water conductor 13 extending therethrough to cool the exhaust gases and thereby prevent fire. Conductor 13 leads from the cooling chambers of the engine and may then be conducted outwardly over the side of the craft into the river or other body of water, or may be emptied directly into the exhaust pipe at a point remote from the exhaust manifold.

A fuel tank 14 for containing hydro-carbon fuel oils of a heavier consistency than the gasoline for which the engines are designed, and leading therefrom is a conductor pipe 15 connected with one end of the drum indicated generally at 16. From the opposite end of the drum 16 leads a conductor pipe 17 having a valve 18 immediate its ends, and the lower end of the conductor 17 is connected with a conductor pipe 9 as at 19 so that the heavier hydro-carbon fuel may be conducted to the carbureter 8.

It is to be noted that the drums 16 in either type of engine shown in Figure 1 or Figure 4, are disposed upon the exhaust pipe 20 in a plane parallel with the flow of the gases.

Referring particularly to Figures 1, 2 and 3 of the drawings, wherein the device in accordance with this invention is applied to a particular type of marine engine, the exhaust pipe 20 leads away from the exhaust manifold 12 at right angles thereto and is disposed in a vertical plane. Adjacent the bottom of the conically extending exhaust pipe it takes another bend and leads rearwardly out of the craft at right angles to the vertically disposed section. Around the vertically disposed section 20 of the exhaust pipe, there is formed a jacket 21 which is connected to the intake manifold 22 adjacent its upper end and its lower end is connected for communication with a conductor pipe 23 leading to the carbureter 8.

The incoming charge is therefore heated by the exhaust pipe 20. A second jacket 24 is formed exteriorly of the jacket 21, but is of less length than the latter. The jacket 24 is adapted for containing water and is formed with a short nipple 25 extending radially inwardly through openings in the walls of the jacket 21 and the exhaust pipe 20. The inner end of the nipple 25 is connected with a conductor pipe 26, the upper end of which is connected with conductor 13 as at 7, in the exhaust manifold 12. Water is led from the conductor 13 in the exhaust manifold through connection 27 and conductor 26 into the nipple 25 and then into the cooled jacket 24. The water jacket 24 not only enables the incoming charge to be regulated to the proper temperature, but forms a heating compartment for the drum indicated generally at 16 which is the essence of the present invention.

The drum 16 is secured on the exterior wall of the circular jacket 24 and is provided interiorly with an annular space 28 between the walls of the jacket 24 and the outer wall 29 of the drum. The drum is secured to the outer wall of the jacket 24 in any conventional manner as long as the compartment 28 is liquid-tight. The inlet conductor pipe 15 from the heavy hydro-carbon fuel tank 14, is connected as at 30 to the upper end of the drum and the outlet conductor 17 is connected as at 31 to the lower end thereof.

It will therefore be seen that the heavy hydro-carbon fuel will be conveyed into the compartment 28 whereupon they will be heated by the hot water or steam in the jacket 24 generated by the heat of the exhaust manifold 12. At the upper end of the water jacket 24 as at 32, is connected the upper end of a by-pass conductor pipe 33 having a valve 34 therein and the lower end of the conductor pipe is connected with the exhaust pipe 20 as at 35. In the event the water in jacket 24 is not hot enough, the valve 34 may be closed until the temperature thereof increases to the desired point, whereupon the flow of water into the exhaust pipe 20 may be regulated in accordance with the best efficiency of the engine.

Referring particularly to Figures 4, 5 and 6 of the drawings, wherein the device is applied to a different type of engine from that in Figure 1, a conductor 36 projects laterally from the exhaust manifold 12 and is in connected communication with the water line 13 extending through the exhaust manifold. The drum 16 is supported on the exhaust pipe 20 in spaced relation to the exhaust manifold 12, and is cylindrical in cross section. The drum 16 is hollow and is formed at its opposite ends with laterally projecting flanges 37, 38 that are connected with, as by welding, the outer walls of the exhaust pipe 20.

The hollow space 39 interiorly of the drum receives the hydro-carbon fuel whereupon the latter is heated by the exhaust pipe 20, the outer walls of which form the inner walls of the compartment 39. The drum 16 is disposed in a horizontal plane from the exhaust pipe 20 and at one end as at 40 is connected with the inlet conductor 15. At the opposite end the drum 16 is connected with as at 41, the outlet conductor 17 which leads into the conductor 9.

A branch pipe 42 having a valve 43 thereon, extends through and is connected with the exhaust pipe 20 forwardly of the drum mounting and in event it be desired to cool the heavy hydro-carbon fuel in compartment 39, water may be run into the exhaust pipe 20 in the path of the flowing gases, whereupon considerable cooling effect will be had. In event the exhaust pipe 20 adjacent the drum 15 becomes too cool, valve 43 may be closed, whereupon the water in the conductor 36 may be by-passed through valve 44 to the exhause pipe 20 at a point 45 beyond the drum 16.

In the drum applied to each type of engine in Figures 1 and 4 of the drawings, they are provided with thermometers 46 so that the temperature at which the engine operates most efficiently may be checked very closely under all conditions.

In the application of the invention, when the engine 7 has been started upon gasolene fuel, and the approximate temperature reached on the exhaust pipe that is desired, gasolene is cut off at valve 11, and the valve 18 is opened whereupon the heavier hydrocarbon fuel oil flows through the drum 16 and being heated is passed on to the carbureter 8. Having first determined the efficient temperature for the incoming fuel oil, the water-valve 43 or 34 may be regulated to cool the heavy hydro-carbon oil to the proper temperature.

Since the valves 43 and 34 are manually operable, the flow of water may be adjusted to give the desired temperature of the oil. In the event the oil becomes too cool, the flow may be altered as desired or shut off entirely whereupon no cooling effect is imparted.

Having thus described my invention, what I claim as new is:

1. In combination with an internal combustion engine adapted for using light hydrocarbon fuels, and having a carbureter and a water cooled exhaust manifold, a selectively controlled fuel line leading to the carbureter for conveying light-carbon fuels thereto, a closed drum for receiving heavy hydro-carbon fuels supported on the exhaust pipe having an inlet conductor connected therewith for conducting an independent and heavier fuel than the first mentioned light fuel, and further having a selectively controlled outlet conductor leading from said drum to the carbureter and selectively controlled means for conducting water from the exhaust manifold for cooling said heavier fuels in the drum in the event the temperature reaches a point beyond that required for efficient operation of the internal combustion engine.

2. In combination with an internal combustion engine adapted for using light hydrocarbon fuels, and having a carbureter and a water cooled exhaust manifold, a selectively controlled fuel line leading to the carbureter for conveying light hydrocarbon fuels thereto, a closed drum for receiving heavy hydrocarbon fuels supported on the exhaust pipe having the inlet conductor connected therewith for conducting an independent and heavier fuel than the first mentioned light fuel, and further having a selectively controlled outlet conductor leading from said drum to the carbureter and selectively controlled means for conducting water from the exhaust manifold for cooling said heavier fuels in the drum in the event the temperature reaches a point beyond that required for efficient operation of the internal combustion engine, said drum extending in a plane parallel with the path of the flow of the exhaust gases, and the inlet and outlet conductors disposed at the opposite ends of the drum.

In testimony whereof I affix my signature.

ADOLF BREITLING.